United States Patent
Nakamura

(10) Patent No.: US 11,936,976 B2
(45) Date of Patent: Mar. 19, 2024

(54) VIBRATION APPARATUS, IMAGE PICKUP APPARATUS, CONTROL METHOD OF VIBRATION APPARATUS, AND STORAGE MEDIUM

(71) Applicant: CANON KABUSHIKI KAISHA, Tokyo (JP)

(72) Inventor: Hiroshi Nakamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/152,254

(22) Filed: Jan. 10, 2023

(65) Prior Publication Data

US 2023/0232095 A1 Jul. 20, 2023

(30) Foreign Application Priority Data

Jan. 18, 2022 (JP) ................. 2022-005861

(51) Int. Cl.
| | |
|---|---|
| H04N 23/60 | (2023.01) |
| G03B 13/18 | (2021.01) |
| H04N 23/63 | (2023.01) |
| H04N 23/667 | (2023.01) |
| H04N 23/67 | (2023.01) |
| H04N 23/68 | (2023.01) |

(52) U.S. Cl.
CPC ............ *H04N 23/64* (2023.01); *G03B 13/18* (2013.01); *H04N 23/634* (2023.01); *H04N 23/635* (2023.01); *H04N 23/667* (2023.01); *H04N 23/672* (2023.01); *H04N 23/6811* (2023.01); *H04N 23/6812* (2023.01)

(58) Field of Classification Search
None
See application file for complete search history.

(56) References Cited

U.S. PATENT DOCUMENTS

| | | | |
|---|---|---|---|
| 2021/0271325 A1* | 9/2021 | Seo ............ | H04N 23/959 |
| 2023/0024495 A1* | 1/2023 | Itagaki ............ | G02B 7/02 |
| 2023/0408840 A1* | 12/2023 | Osaka ............ | G02B 7/04 |
| 2023/0408890 A1* | 12/2023 | Osaka ............ | G03B 5/02 |

FOREIGN PATENT DOCUMENTS

| | | | | |
|---|---|---|---|---|
| EP | 2615823 A2 * | 7/2013 | ............ | G02B 7/36 |
| JP | 2006-013661 A | 1/2006 | | |
| JP | 2013-157953 A | 8/2013 | | |
| JP | 2014-164172 A | 9/2014 | | |

* cited by examiner

*Primary Examiner* — Cynthia Segura
(74) *Attorney, Agent, or Firm* — Cowan, Liebowitz & Latman, P.C.

(57) ABSTRACT

A vibration apparatus includes a vibrating unit, and a control unit configured to control vibration of the vibrating unit. The control unit changes a vibration pattern of the vibrating unit by controlling the vibrating unit so as to change at least one of a vibration amplitude, a vibration frequency, and a vibration time according to at least one of a detection result of an offset amount from an in-focus position and a detection result of a predetermined object image in a mode that continuously performs autofocus processing.

20 Claims, 10 Drawing Sheets

VIBRATION APPARATUS, IMAGE PICKUP APPARATUS, CONTROL METHOD OF VIBRATION APPARATUS, AND STORAGE MEDIUM

BACKGROUND

Technical Field

One of the aspects of the disclosure relates to a vibration apparatus, an image pickup apparatus, a control method of the vibration apparatus, and a storage medium.

Description of the Related Art

An image pickup apparatus having a vibration device has conventionally been known. Japanese Patent Laid-Open No. ("JP") 2013-157953 discloses an image pickup apparatus having a tactile sensation generating unit for informing a user of a direction of moving the image pickup apparatus in order to place the desired object in a preset object area.

The image pickup apparatus disclosed in JP 2013-157953 requires prior setting for imaging, and thus has difficulty in handling changes in an imaging situation.

SUMMARY

One of the aspects of the disclosure provides a vibration apparatus that can properly inform a user of an imaging state by generating a variety of vibrations based on imaging states.

A vibration apparatus according to one aspect of the disclosure includes a vibrating unit, at least one processor, and a memory coupled to the at least one processor, the memory having instructions that, when executed by the processor, perform operations as a control unit configured to control vibration of the vibrating unit. The control unit changes a vibration pattern of the vibrating unit by controlling the vibrating unit so as to change at least one of a vibration amplitude, a vibration frequency, and a vibration time according to at least one of a detection result of an offset amount from an in-focus position and a detection result of a predetermined object image in a mode that continuously performs autofocus processing. An image pickup apparatus having the above vibration apparatus, a control method of the above vibration apparatus, and a storage method storing a program that enables a computer to execute the above control method also constitute another aspect of the disclosure.

Further features of the disclosure will become apparent from the following description of exemplary embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

BRIEF DESCRIPTION OF THE DRAWINGS

FIG. 6D is a flowchart of the vibration control processing.

DESCRIPTION OF THE EMBODIMENTS

Referring now to the accompanying drawings, a detailed description will be given of embodiments according to the disclosure.

Figure 1A:
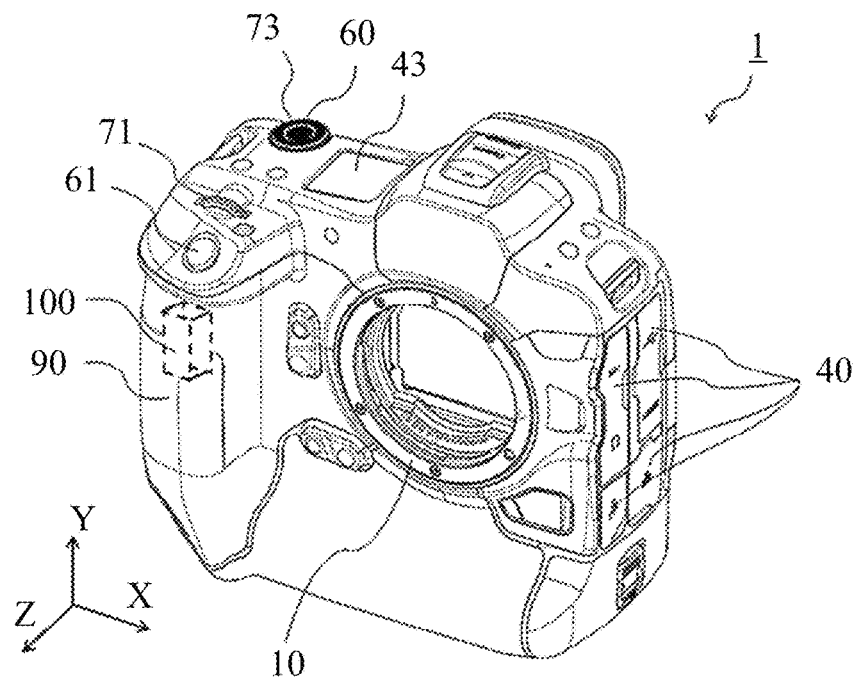
FIGS. 1A and 1B are external perspective views of an image pickup apparatus and FIG. 1C is a configuration diagram of a vibration device according to this embodiment.
Figure 1B:
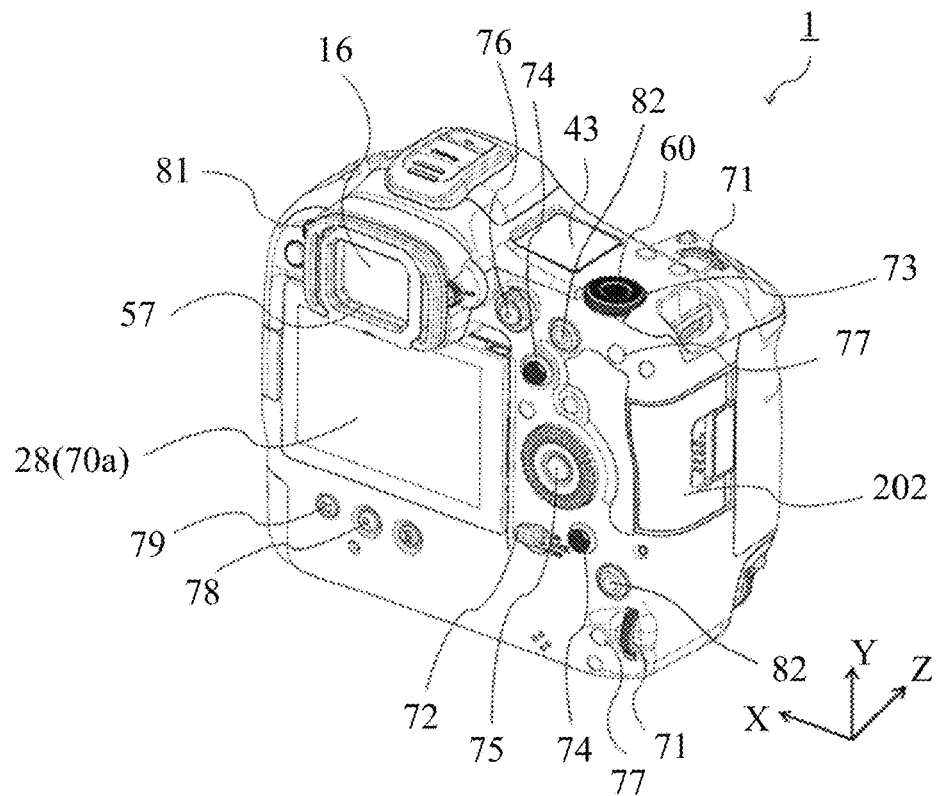

Referring now to FIGS. 1A and 1B, a description will be given of an image pickup apparatus (digital camera) 1 according to this embodiment. FIG. 1A is a front perspective view of the image pickup apparatus 1, and FIG. 1B is a rear perspective view of the image pickup apparatus 1. In FIG. 1B, a display unit 28 is a display unit provided on the rear surface of the image pickup apparatus 1 and configured to display images and various information. A touch panel 70a can detect a touch operation on a display plane (operation plane) of the display unit 28. An extra-finder display unit 43 is a display unit provided on the top surface of the image pickup apparatus 1 and displays a variety of setting values of the image pickup apparatus 1 such as a shutter speed and an F-number (or an aperture value).

A shutter button 61 is an operation unit for instructing imaging, and is a switch having a two-stage detecting unit in a pressing direction. The shutter button 61 performs an autofocus (AF) operation when detecting the turning on of the first stage, and performs an imaging operation when detecting the turning on of the second stage after the shutter button 61 is further pressed from the first stage. A customizing function of the operation button can change the operation of the image pickup apparatus 1 in a case where the turning on of the first stage is detected. For example, auto-exposure ("AE") may be enabled without operating AF.

A mode switch 60 is an operation unit for switching between various modes. Terminal covers 40 are covers that protect connectors (not illustrated) such as a connector for a connection cable that connects an external device and the image pickup apparatus 1. A main electronic dial 71 is a rotary operation member included in the operation unit 70. Rotating the main electronic dial 71 can change setting values such as the shutter speed and F-number.

A power switch 72 is an operation member that switches between the power-on and the power-off of the image pickup apparatus 1. A sub-electronic dial 73 is a rotary operation member included in the operation unit 70, and configured to move a selection frame, to feed an image, and the like. A multi-directional key (eight-direction key) 74 is included in the operation unit 70, operable in eight directions: up, down, left, right, oblique upper right, oblique lower right, oblique lower left, and oblique upper left, and configured to provide an operation corresponding to the pressed portion of the multi-directional key 74. A SET button 75 is a push button that is included in the operation unit 70, and mainly used to determine a selected item.

A moving image button 76 is used to instruct the start and stop of motion image capturing (recording). An AE lock button 77 is included in the operation unit 70, and configured to fix the exposure state when pressed in an imaging standby state. An enlargement button 78 is included in the operation unit 70 and is an operation button configured to turn on and off an enlargement mode in live-view ("LV") display in the imaging mode. Operating the main electronic dial 71 after the enlargement mode is turned on can enlarge or reduce an LV image. In a play (or playback) mode, it functions as an enlargement button configured to enlarge a played image and to increase an enlargement ratio.

A play button 79 is included in the operation unit 70, and is an operation button configured to switch between the imaging mode and the play mode. Pressing the play button 79 in the imaging mode shifts the mode to the play mode, and can display the latest image among images recorded in a recording medium 200 displayed on the display unit 28. A menu button 81 is included in the operation unit 70, and pressing the menu button 81 can display on the display unit 28 a menu screen on which a variety of types of settings can be made. The user can intuitively perform a variety of types of settings using the menu screen displayed on the display unit 28, the multi-directional key 74, the SET button 75, and the like.

A camera-side communication terminal 10 is a communication terminal for communicating with a lens unit 150 that is attachable to and detachable from the image pickup apparatus 1. An eyepiece unit 16 is an eyepiece of an eyepiece finder (peer-type viewfinder), and the user can view an image displayed on an internal electronic viewfinder (EVF) 29 through the eyepiece unit 16. An eye approach detecting unit 57 is an eye approach detecting sensor that detects whether or not the eye of the user approaches the eyepiece unit 16, and is disposed inside the eyepiece unit 16. A lid 202 is a lid of a slot in which the recording medium 200 is stored. A front grip unit 90 is a holding unit having a shape that is easy for the user to grip with his right hand in holding the image pickup apparatus 1. A vibration device (vibrating unit) 100 is attached to the inner surface of the front grip unit 90.

The vibration device 100 generates a variety of vibrations according to imaging states described below, and vibrates the front grip unit 90. The vibration device 100 is a vibration device such as a linear resonant actuator (LRA) type, piezoelectric element type, and a voice coil (VC) motor type, and can variably set vibration parameters such as vibration intensity (amplitude) and vibration frequency. Changing the vibration parameter can generate a variety of vibration patterns. The vibration device 100, and a control unit (system control unit 50) that controls the vibration of the vibration device 100 constitute a vibration apparatus.

The shutter button 61 and the main electronic dial 71 are disposed at positions operable with the index finger of the right hand while the image pickup apparatus 1 is held by gripping the front grip unit 90 with the little finger, ring finger, and middle finger of the right hand. The multi-directional key 74 and the sub-electronic dial 73 are disposed at positions operable with the thumb of the right hand in the same state.

Figure 1C:
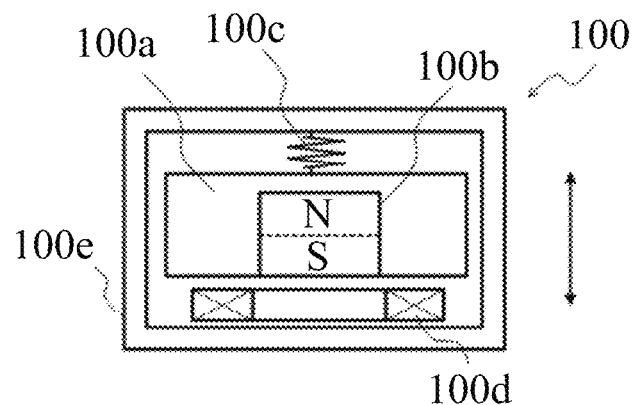

Referring now to FIG. 1C, a description will be given of the LRA-type vibration device as an example of the vibration device 100 attached to the front grip unit 90. The LRA-type vibration device 100 includes a vibrator 100a, a magnet 100b, a spring 100c, a coil 100d, and a base 100e. The vibrator 100a holds the magnet 100b and is movably coupled to the base 100e by the spring 100c. The coil 100d is disposed near the magnet 100b and electrically connected to a circuit board (not illustrated). The coil 100d is supplied with a current from the circuit board and generates an electromagnetic force, and the vibrator 100a reciprocates due to the electromagnetic force and the attraction force or repulsion force with the magnet 100b. As a result, vibration occurs in a two-way arrow direction in FIG. 1C.

Figure 2:
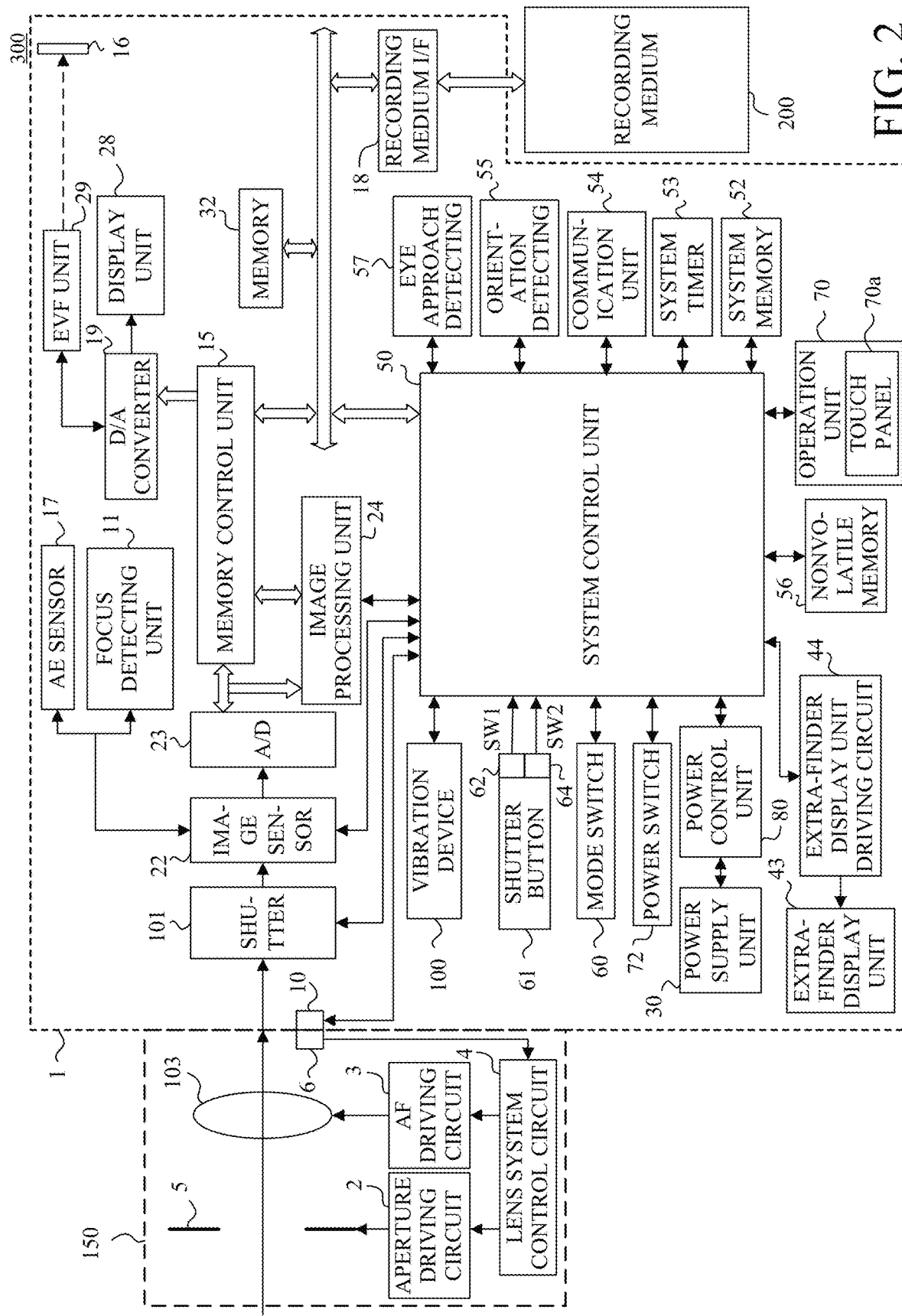
FIG. 2 is a block diagram of an imaging system according to this embodiment.

Referring now to FIG. 2, a description will be given of a hardware configuration example of an imaging system 300. FIG. 2 is a block diagram of the imaging system 300. The imaging system 300 includes the image pickup apparatus (camera body) 1 and the lens unit (lens apparatus) 150 attachable to and detachable from the image pickup apparatus 1. However, this embodiment is not limited to this example, and is also applicable to an image pickup apparatus in which a camera body and a lens apparatus are integrated with each other.

A lens (imaging optical system) 103 normally includes a plurality of lenses, but only one lens is illustrated herein for simplicity. A lens-side communication terminal 6 is a communication terminal that enables the lens unit 150 to communicate with the image pickup apparatus 1, and the camera-side communication terminal 10 is a communication terminal that enables the image pickup apparatus 1 to communicate with the lens unit 150. The lens unit 150 communicates with the system control unit (control unit) 50 via the lens-side communication terminal 6 and the camera-side communication terminal 10. The lens unit 150 controls an aperture stop (diaphragm) 5 via an aperture driving circuit 2 by an internal lens system control circuit 4 and shifts the position of the lens 103 via an AF driving circuit 3 so as to provide focusing.

An AE sensor 17 measures the luminance of the object through the lens unit 150. A focus detecting unit 11 outputs defocus amount information to the system control unit 50. The system control unit 50 controls the lens unit 150 based on the defocus amount information and performs phase-difference AF. The focus detecting unit 11 may use a dedicated phase-difference sensor, but is not limited to this example, and may be configured as an imaging-plane phase-difference sensor of the image sensor 22.

A shutter 101 is a focal plane shutter that can freely control the exposure time of the image sensor 22 under the control of the system control unit 50. The image sensor 22 is a photoelectric conversion element including a CCD, a CMOS element, or the like that converts an optical image formed by the lens 103 into an electric signal. Among the functions of the system control unit 50, the image sensor 22 constitutes an imaging unit together with an imaging control unit that controls imaging using the image sensor 22. An A/D converter 23 converts an analog signal into a digital signal. The A/D converter 23 is used to convert an analog signal output from the image sensor 22 into a digital signal.

An image processing unit 24 performs predetermined pixel interpolation, resizing processing such as reduction, and color conversion processing for data from the A/D converter 23 or data from a memory control unit 15. The image processing unit 24 also performs predetermined calculation processing using captured image data. Based on the calculation result obtained by the image processing unit 24, the system control unit 50 performs exposure control and focus detection (distance measurement) control. As a result, through-the-lens (TTL) AF processing, AE processing, and flash pre-emission (EF) processing are performed. The image processing unit 24 performs predetermined calculation processing using the captured image data, and performs TTL Auto White Balance (AWB) processing based on the obtained calculation result.

Output data from the A/D converter 23 is directly written in a memory 32 via the image processing unit 24 and the memory control unit 15 or via the memory control unit 15. The memory 32 stores image data obtained by the image sensor 22 and converted into digital data by the A/D converter 23 and image data to be displayed on the display unit 28 and the EVF 29. The memory 32 has a storage capacity sufficient to store a predetermined number of still images, moving images for a predetermined period, and audio data. The memory 32 also serves as a memory (video memory) for image display.

A D/A converter 19 converts data for image display stored in the memory 32 into an analog signal and supplies it to the display unit 28 and the EVF 29. Thereby, the display image data written in the memory 32 is displayed on the display unit 28 or the EVF 29 via the D/A converter 19. The display unit 28 and the EVF 29 display information according to the analog signal from the D/A converter 19 on a display device such as LCD or organic EL. A variety of setting values of the camera, such as a shutter speed and an F-number, are displayed on the extra-finder display unit 43 via an extra-finder-display-unit driving circuit 44. A nonvolatile memory 56 is an electrically erasable and recordable memory, such as an Electrically Erasable Programmable Read-Only Memory (EEPROM). The nonvolatile memory 56 stores constants and programs for the operation of the system control unit 50.

The system control unit 50 is a control unit that includes at least one processor or circuit, and controls the entire image pickup apparatus 1. The system control unit 50 causes the vibration device 100 to generate vibration according to the imaging state of the image pickup apparatus 1 or in a case where the user operates the variety of operation units described above. The system control unit 50 implements each processing according to this embodiment, which will be described below, by executing the program recorded in the nonvolatile memory 56 described above. A RAM, for example, is used for a system memory 52 to develop constants and variables for operations of the system control unit 50, programs read out of the nonvolatile memory 56, and the like. The system control unit 50 performs display control by controlling the memory 32, the D/A converter 19, the display unit 28, and the like. A system timer 53 is a timer that measures the time for a variety of controls and the time of a built-in clock.

The mode switch 60, a first shutter switch 62, a second shutter switch 64, and the operation unit 70 constitute an operation unit that inputs a variety of operation instructions into the system control unit 50. The mode switch 60 switches the operation mode of the system control unit 50 among a still image capturing mode, a moving (motion) image capturing mode, a play mode, and the like. Modes in the still image capturing mode include an automatic imaging mode, an automatic scene discrimination mode, a manual mode, an F-number (aperture-value (Av)) priority mode (Av mode), a shutter speed priority mode (Tv mode), a program AE mode (P mode), and the like. In addition, there are a variety of scene modes and custom modes that are imaging settings for each imaging scene. The mode switch 60 allows the user to switch directly among any of these modes. Alternatively, after the mode switch 60 temporarily switches the mode to a list screen of the imaging mode, any one of the plurality of displayed modes may be selected and switched by another operation member. Similarly, the moving image capturing mode may also include a plurality of modes.

The first shutter switch 62 is turned on when the shutter button 61 provided to the image pickup apparatus 1 is operated halfway or half-pressed (imaging preparatory instruction), and generates a first shutter switch signal SW1. The imaging preparatory operation such as AF processing, AE processing, AWB processing, and EF processing is started in response to the first shutter switch signal SW1. The second shutter switch 64 is turned on when the operation of the shutter button 61 is completed, that is, when the shutter button 61 is fully pressed (imaging instruction), and generates a second shutter switch signal SW2. In response to the second shutter switch signal SW2, the system control unit 50 starts a series of imaging processing operations from reading a signal out of the image sensor 22 to writing as an image file a captured image in the recording medium 200.

The operation unit 70 includes a variety of operation members as an input unit that accepts an operation from the user. The operation unit 70 includes at least the following operation units: the shutter button 61, the main electronic dial 71, the power switch 72, the sub-electronic dial 73, the multi-directional key 74, the SET button 75, the moving image button 76, the AE lock button 77, the enlargement button 78, the play button 79, and the menu button 81.

A power supply control unit 80 includes a battery detecting circuit, a DC-DC converter, a switching circuit for switching a block to be energized, etc., and detects whether or not a battery is installed, a type of battery, and a remaining battery amount. The power supply control unit 80 controls the DC-DC converter based on the detection result and instruction from the system control unit 50, and supplies the necessary voltage to each unit including the recording medium 200 for a necessary period. The power supply unit 30 includes a primary battery such as an alkaline battery or a lithium battery, a secondary battery such as a NiCd battery, a NiMH battery, or a Li battery, an AC adapter, and the like. A recording medium I/F 18 is an interface with the recording medium 200 such as a memory card or hard disk drive. The recording medium 200 is a recording medium such as a memory card for recording a captured image, and includes a semiconductor memory, a magnetic disk, or the like.

A communication unit 54 is connected wirelessly or via a wired cable, and transmits and receives video and audio signals. The communication unit 54 can be connected to a wireless Local Area Network (LAN) and the Internet. The communication unit 54 can communicate with an external device using Bluetooth (registered trademark) or Bluetooth Low Energy. The communication unit 54 can transmit images (including LV images) captured by the image sensor 22 and images recorded in the recording medium 200, and can receive images and various other information from the external device.

An orientation detecting unit 55 detects an orientation of the image pickup apparatus 1 relative to the gravity direction. Based on the orientation detected by the orientation detecting unit 55, it is determined whether an image captured by the image sensor 22 is an image captured with the horizontally held image pickup apparatus 1 or an image captured with the vertically held image pickup apparatus 1. The orientation detecting unit 55 can use an acceleration sensor, a gyro sensor, or the like. A motion of the image pickup apparatus 1 (pan, tilt, lift, whether or not it is stationary, etc.) can be detected by using an acceleration sensor or a gyro sensor, which is the orientation detecting unit 55.

An eye approach detecting unit 57 is an eye approach detecting sensor that detects the approach and departure of the eye (object) from the eyepiece unit 16 of the viewfinder (approach detection). The system control unit 50 switches the states of the display unit 28 and the EVF 29 between the display (display state) and the non-display (non-display state) according to the state detected by the eye approach detecting unit 57. More specifically, at least in the imaging standby state and in a case where the display destination is automatically switchable, the display destination in the non-approach state of the eye is set to the display unit 28 and the display of the EVF 29 is turned off. During the eye approach, the display destination is set to the EVF 29, and the display of the display unit 28 is turned off.

The touch panel 70a and the display unit 28 can be integrated with each other. For example, the touch panel 70a is configured such that the light transmittance does not interfere with the display of the display unit 28 and is attached to the top layer of the display plane of the display unit 28. The input coordinates on the touch panel 70a and the display coordinates on the display screen of the display unit 28 are associated with each other. This configuration can provide a graphical user interface (GUI) as if the user could directly operate the screen displayed on the display unit 28.

Figure 3A:
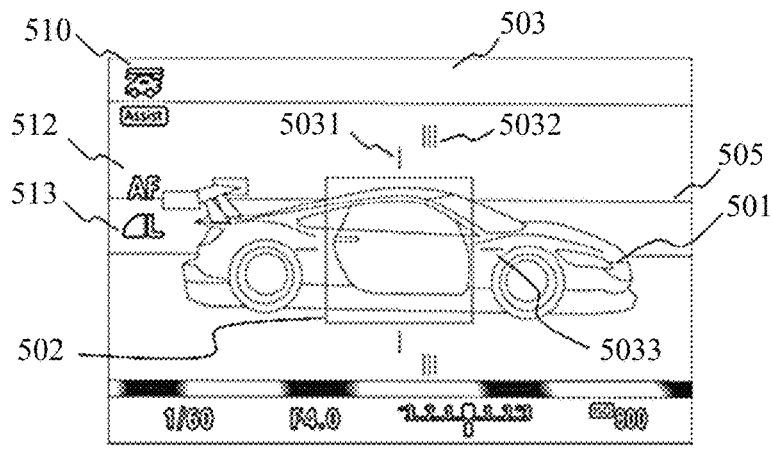
FIGS. 3A to 3C illustrate vibration control processing while a follow-shot assisting function is acting according to this embodiment.

Referring now to FIGS. 3A to 6D, a description will be given of vibration control processing according to this embodiment. FIGS. 3A to 3C explain the vibration control processing during the operation of the follow shot assisting function, and illustrate examples of display of LV images in the image pickup apparatus 1. FIG. 3D is a flowchart illustrating the operation of the vibration device 100 in the vibration control processing during the operation of the follow shot assisting function.

As illustrated in FIG. 3A, the system control unit 50 displays a detecting area 502 in a target area for blur detection by superimposing it on an LV image. The detecting area 502 is displayed at a position arbitrarily designated by the user (the initial position is, for example, the central position). The user previously sets the position of the detecting area 502 so that the composition is as intended by the user, and pans the image pickup apparatus 1 so that the main object can be placed in that position. Therefore, the user can capture the main object as intended. A blur indicator 503 includes a line segment 5031 indicating the horizontal center of the detecting area 502, a line segment 5032 indicating a blur amount, and a line segment 5033 indicating the vertical center of the detecting area 502.

Figure 3B:
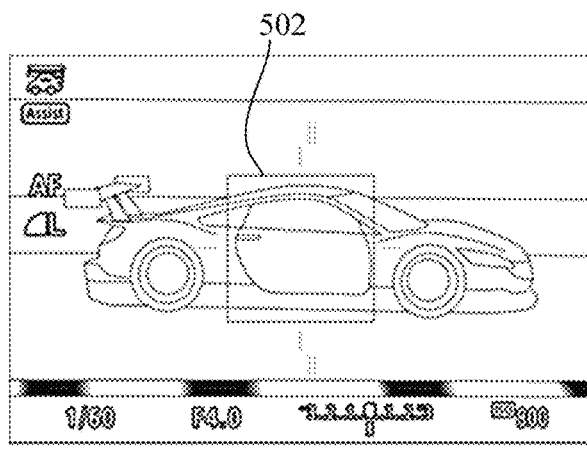
Figure 3C:
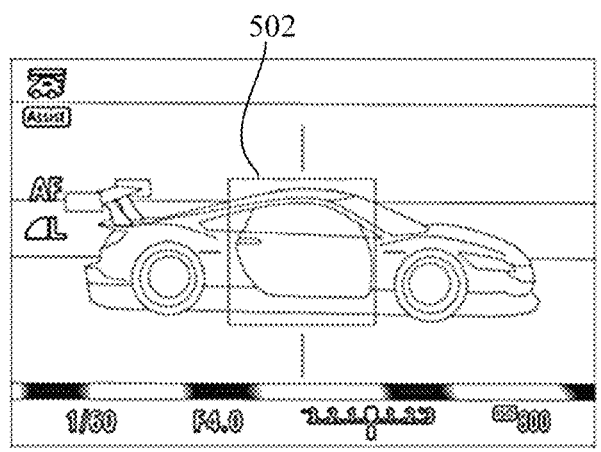

FIGS. 3A to 3C illustrate display examples of a follow-shot of a car object that laterally moves in the real world while laterally moving (panning) the camera, and a description will be given of the operation status of the follow-shot assisting function as an example.

In FIG. 3A, a line segment direction D=Vertical, that is, the blur indicator 503 with the number of blur amount line segments N=3 is displayed in the vertical direction of the detecting area 502 to the right (on the side of the moving direction of the car). This indicates that the panning speed is slower than the moving speed of the main object, and that if the release operation is made in this state, the main object will be blurred. In FIG. 3A, the blur indicator is displayed in red, which indicates that a blur amount is large, as associated with the traffic signal.

In FIG. 3B, the line segment direction D=Vertical, that is, the blur indicator 503 with the number of blur amount line segments N=2 is displayed in the vertical direction of the detecting area 502 slightly to the right (on the side of the moving direction of the car). This indicates that the panning speed is slightly slower than the moving speed of the main object, and indicates that if the release operation is made in this state, the main object will be blurred. In FIG. 3B, the blur indicator 503 is displayed in yellow, indicating that the blur amount is moderate as associated with the traffic signal.

In FIG. 3C, the line segment direction D=Vertical, that is, the blur indicator 503 with the number of blur amount line segments N=1 is displayed in the vertical direction of the detecting area 502. This indicates that the panning speed is approximately the same as the moving speed of the main object, and that if the release operation is made in this state, the main object will be captured stationary (follow shot will be successful). That is, it displays a photo opportunity. In FIG. 3C, the blur indicator is displayed in green, indicating that the blur amount is extremely small, as associated with the traffic signal.

Figure 3D:
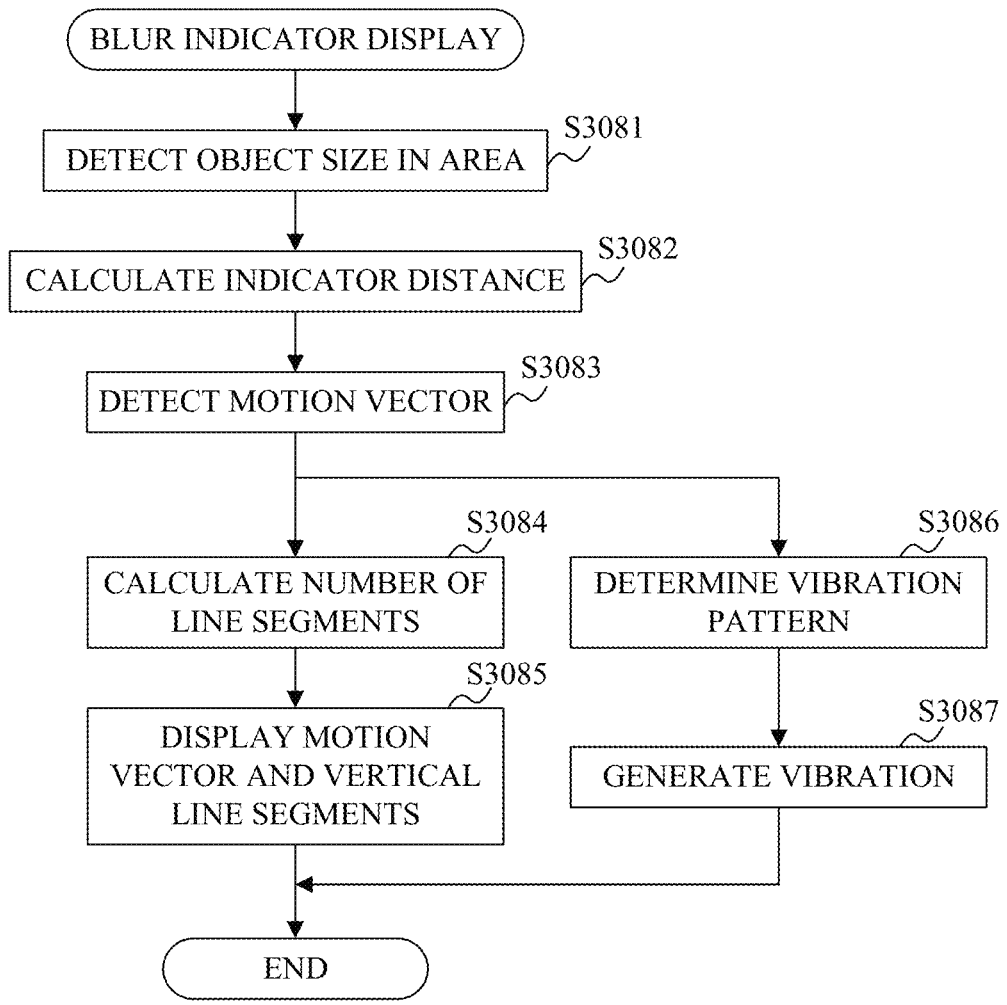
FIG. 3D is a flowchart of the vibration control processing.

FIG. 3D illustrates an operation flowchart of the vibration device 100 in the vibration control processing during the operation of the follow-shot assisting function. Each step in FIG. 3D is mainly executed by the system control unit 50.

First, in step S3081, the system control unit 50 recognizes as a main object an object that exists in the detecting area 502, and detects the size of the main object on the display unit 28. Next, in step S3082, the system control unit 50 calculates an indicator distance L based on the detected size of the main object.

Next, in step S3083, the system control unit 50 detects a "motion vector" at a position on a straight line passing through the center of the detecting area 502. The "motion vector" is a vector that indicates how much and in what direction an image has moved, and is detected by performing pattern matching between a certain image and an image that is previous by one field or between two arbitrary images. Next, in step S3084, the system control unit 50 calculates the number of line segments N forming the display of the blur indicator, based on a component with large temporal fluctuations (or a component parallel to a moving direction of the image pickup apparatus 1) of horizontal and vertical components in the detected "motion vector." In step S3085, the system control unit 50 displays a line segment perpendicular to the motion vector.

In step S3086, the system control unit 50 determines the vibration (vibration pattern) of the vibration device 100 based on the magnitude of the component calculated in step S3084. In step S3087, the system control unit 50 generates the vibration determined in step S3086. In a case of a relatively large "motion vector" component (large blur) within an intensity range that can be generated by the vibration device 100, the system control unit 50 controls the vibration so as to make larger the vibration intensity (amplitude) and to make higher the vibration frequency. On the other hand, in a case of a small "motion vector" component (small blur), the system control unit 50 controls the vibration so as to make smaller the vibration intensity (amplitude) and to make lower the vibration frequency. The vibration intensity is controlled by a combination of the intensity of voltage amplitude, length of vibration pulse (vibration frequency), and length of vibration time. The size and weight of the housing of the image pickup apparatus 1, the size and weight of the mounted lens unit 150, the continuous imaging speed, and the like can be properly adjusted according to the setting state of the image pickup apparatus 1. In a case where the panning speed is approximately the same as the moving speed of the main object and the follow shot is successful as illustrated in FIG. 3C, the vibration device 100 is not vibrated.

Thus, in this embodiment, the system control unit 50 changes the vibration pattern of the vibration device 100 based on the magnitude of the motion vector about the object (the magnitude of the motion about the object in the image) in a case where the blur state of the object is detected within an imaging composition (within an imaging range) during the operation of the follow-shot assisting function. Here, in this embodiment, the vibration pattern refers to a vibration amplitude, a vibration frequency, and a vibration time, and the vibration pattern can be changed by changing at least one of them. For example, in a case where the motion vector is a first motion vector, the system control unit 50 controls the vibration so as to change the vibration amplitude and vibration frequency to a first vibration amplitude and a first vibration frequency, respectively. In a case where the motion vector is a second motion vector larger than the first motion vector, the system control unit 50 controls the vibration so as to change the vibration amplitude and vibration frequency to a second vibration amplitude and a second vibration frequency, respectively. At this time, the second vibration amplitude is larger than the first vibration amplitude, and the second vibration frequency is higher than the first vibration frequency. The system control unit 50 determines that in a case where the motion vector is a third motion vector smaller than the first motion vector (the magnitude of the motion vector of the object is smaller than a value (threshold) for determining that there is no object blur), the vibration device 100 is not vibrated.

As described above, by transmitting the states of large, small, and no blur amount of the main object to the user through vibration intensity changes, the vision of the user can be concentrated on the object, and thus the follow-shot assist can be provided in the concentrated state on the imaging action.

Figure 4:
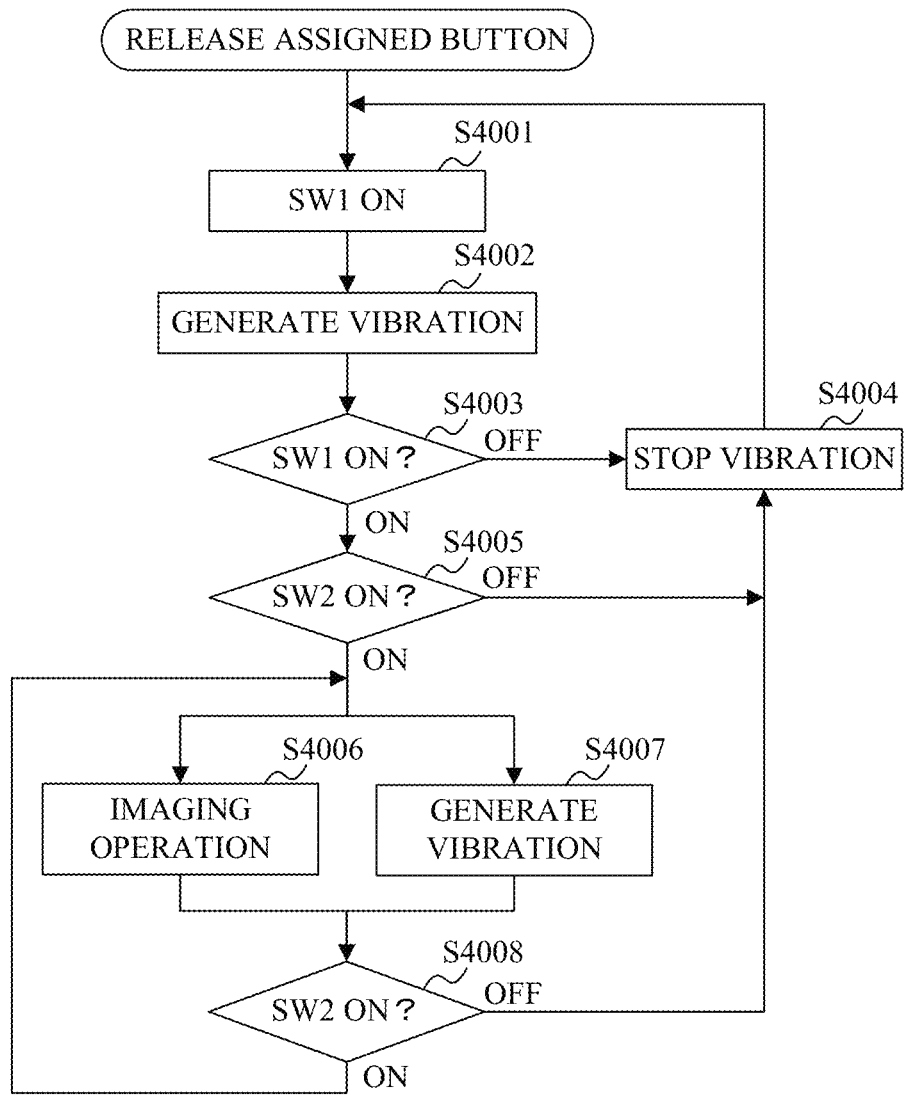
FIG. 4 is a flowchart of vibration control processing in a case where a release function button is pressed according to this embodiment.

FIG. 4 is a flowchart illustrating vibration control processing of the vibration device 100 in a case where the release button in the image pickup apparatus 1 is half-pressed. Each step in FIG. 4 is mainly executed by the system control unit 50. In a case where the release operation is made by pressing the button in the image pickup apparatus 1, the button is configured such that multi-stage pressing can be detected. This embodiment performs the release operation by fully pressing the shutter button 61 (the second shutter switch 64) in which two-stage pressing can be detected.

First, in step S4001, due to the so-called half-pressing (first shutter switch 62) in the button pressing operation, the first shutter switch signal SW1 is generated (SW1 ON). Next, in step S4002, the system control unit 50 controls the vibration device 100 to generate vibration according to the generation of the first shutter switch signal SW1 (SW1 ON).

In response to SW1 ON, the system control unit 50 starts imaging preparatory operations such as AF processing, AE processing, AWB processing, and EF processing, but the vibration (such as vibration intensity) may be changed according to the function. Due to this vibration, the user can recognize a state in which the release operation will be realized by further pressing the shutter button 61.

Next, in step S4003, the system control unit 50 determines whether or not the pressing of the shutter button 61 continues (SW1 ON). In a case where the user stops pressing the shutter button 61 and turns off SW1 (SW1 OFF), the flow proceeds to step S4004. In step S4004, the system control unit 50 controls the vibration device 100 to stop the vibration and the flow returns to step S4001. On the other hand, if the SW1 ON state continues, the flow proceeds to step S4005. In step S4005, the system control unit 50 determines whether or not the user has further pressed the shutter button 61 from SW1 ON and turned on SW2. In a case where SW2 is turned on, the flow proceeds to steps S4006 and S4007.

In step S4006, the system control unit 50 performs the release operation (imaging operation). In step S4007, the system control unit 50 generates vibration that has been set to the release operation. For example, in a case where silent imaging is set, the operation sound of the shutter does not occur, and in an attempt to avoid sound notification due to quietness, vibration can quietly notify the user of the release operation. The vibration generated in step S4002 indicating the input of the imaging preparation instruction (SW1 ON) and the vibration generated in step S4007 indicating the release operation may be made different (for example, the vibration generated in step S4007 is relatively stronger than that in step S4002). Thereby, the user can distinguish the state of the image pickup apparatus 1 according to a difference in the sensation of the vibration. This difference may be arbitrarily changeable according to the preference of the user or imaging method. Vibration may be driven at one of the input of the imaging preparation instruction and the input of the imaging instruction.

Thus, in this embodiment, the system control unit 50 generates vibration in a state in which a predetermined operation unit, such as the shutter button 61, is operated (such as a state in which the predetermined operation unit is half-pressed or fully pressed). This embodiment has described an example of using the shutter button 61 as the predetermined operation unit, but another two-stage switch may be used. For example, in a case where an AF ON button 82 in FIG. 1B is a two-stage switch, half-pressing of the AF ON button 82 can be assigned to an AF ON instruction, and full pressing of the AF ON button 82 can be assigned to an imaging instruction. In that case, the AF ON button 82 can be applied to the predetermined operation unit. Thus, in a case where there are a plurality of buttons (operation units) that can instruct the release operation, vibration may be generated in response to the first shutter switch signal SW1 (the input of the imaging preparation instruction). Thereby, the user can be notified of which button is to be operated to enable the release operation before the release operation. In this implementation, the operating state of the two-stage switch, which is generally used for the shutter button, is notified by vibration, but the disclosure is not limited to this example. As long as it is a multi-stage switch having two or more stages that generate one of a plurality of types of signals according to the pressing force, it may be applied to the operation unit that does not issue an imaging instruction and which signal generating state is set may be notified by changing the vibration pattern.

Figure 5B:
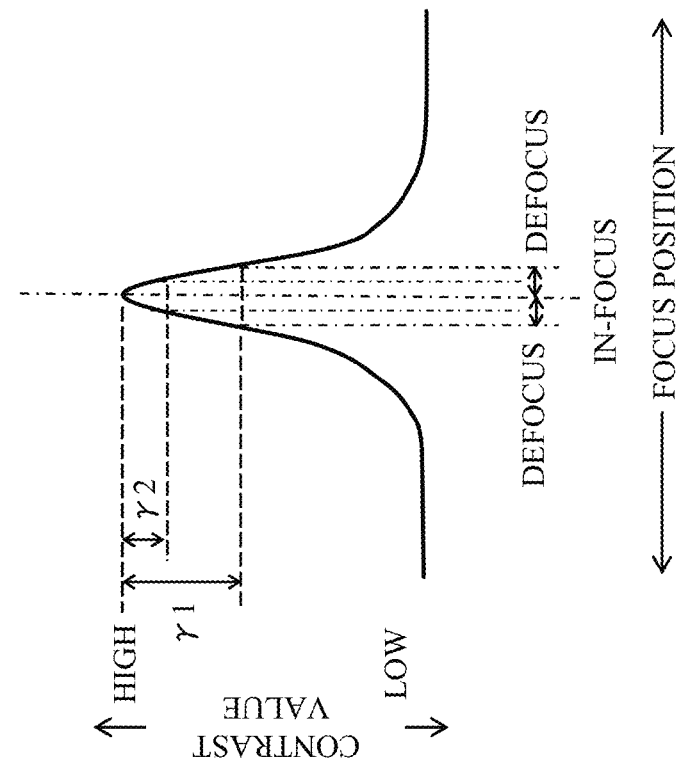
FIGS. 5A and 5B illustrate vibration control processing according to focus determination during continuous AF operation in this embodiment.
Figure 5A:
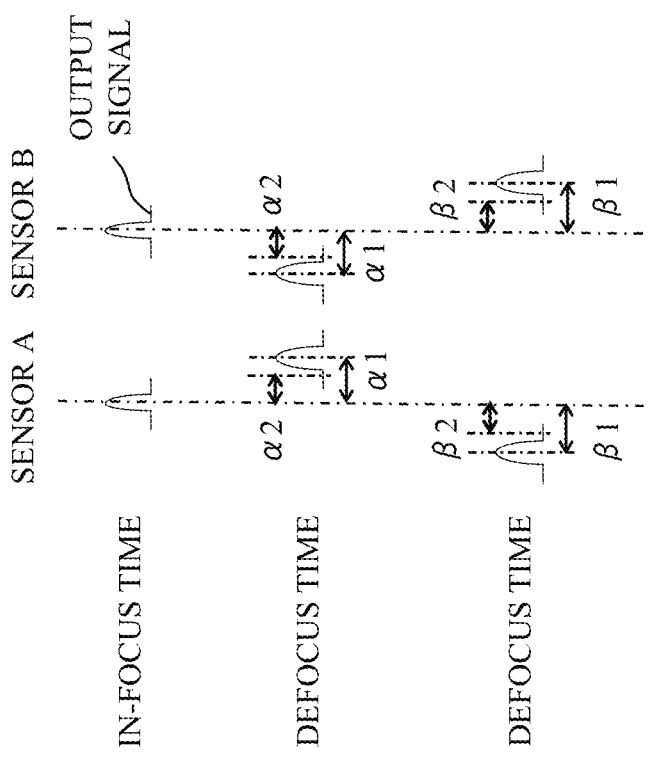
Figure 5C:
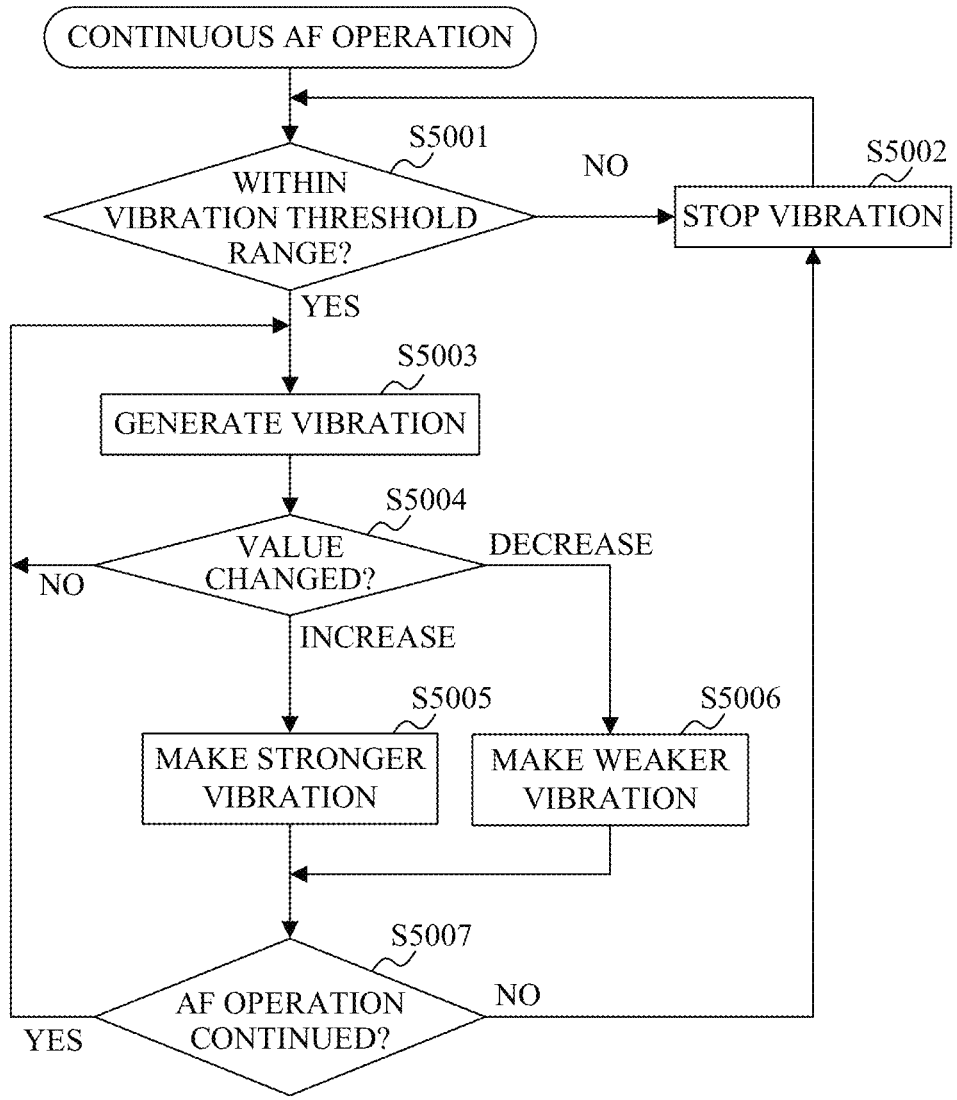
FIG. 5C is a flowchart of the vibration control processing.

FIGS. 5A to 5C are views and a flowchart of vibration control processing according to in-focus determination during continuous AF. The AF operation mode of the image pickup apparatus 1 includes one-shot AF that fixes an in-focus position at the moment when the AF operation instruction is generated, and continuous AF that continues an AF operation while the AF operation instruction continues and causes a focus position to follow the object, which is also referred to as servo AF or tracking AF.

The conventional continuous AF technology has a function (also referred to as a release priority mode) that prioritizes continuous imaging speed (imaging) over focusing during continuous imaging (continuous shooting) operation. This function can provide continuous imaging even in a state in which the focus state is separated from the in-focus position and determined to be out of focus, but has a problem in that a defocus (out-of-focus) image is captured. This embodiment generates vibration in a case where an offset amount between a current focus position and an in-focus position is smaller than an arbitrarily and previously set offset amount (threshold), that is, in a state determined to be in focus. Thereby, the user can intermittently recognize the in-focus state through vibration in a case where the continuous AF is continuously driven (in a case where the continuous AF mode is set), for example, in imaging and tracking a moving object. Even in a case where the continuous AF mode is set, in a mode (also referred to as a focus priority mode) that allows imaging only after the in-focus state is obtained, the user can recognize the in-focus state by the imaging. Hence, in one specification, even if the continuous AF mode is set, the in-focus state may not be notified through vibration in the focus priority mode and the in-focus state may be notified through vibration in the release priority mode. The conventional technology for notifying the user of the in-focus state uses a method of generating a sound when the in-focus state is obtained in the one-shot AF, a method of lighting up an in-focus mark in the viewfinder, and a method of lighting up a mark that indicates that AF operation is ongoing. However, in the case where the notification using the in-focus sound during the continuous AF intermittently continues the sound during imaging and may not be preferable in an imaging environment. Vibration along with the conventional notification can more reliably and quietly send the in-focus notification. In particular, the user has difficulty in visually confirming minute changes in the in-focus state of the main object while recognizing the entire viewfinder or LV image. Due to the vibration operation according to this embodiment, the user can recognize during imaging the in-focus state as the non-vibration state and the defocus state as the vibration state, in which the defocus level becomes higher as the vibration becomes stronger. A future in-focus position may be predicted from the past in-focus position in the continuous AF. In this case, a defocus amount detected by driving a focus lens to a position corresponding to the current in-focus position predicted based on the past in-focus position is detected as an offset amount between the current focus position and the in-focus position.

FIG. 5A is a general explanatory diagram of changes in output signals (focus signals) between the in-focus state and the defocus state and a set value of an offset amount from the in-focus position in a case where the AF sensor is of the phase-difference detection type. A description will now be given along with the operation flowchart illustrated in FIG. 5C. An in-focus state is determined by a positional offset between output signals from two sensors A and B illustrated in FIG. 5A. Now assume that al (front side) and (31 (rear side) are offset amounts (defocus amounts) from a certain in-focus position, which are determined to be out of focus at this time. In other words, the in-focus state is determined in a case where the current focus position is offset forward from the in-focus position and the offset amount from the in-focus position is smaller than al. The in-focus state is determined in a case where the current focus position is offset backward from the in-focus position and the offset amount from the in-focus position is smaller than $\beta 1$. Here, $\alpha 2$ and $\beta 2$ are set in a positional relationship such that $\alpha 1 > \alpha 2$ and $\beta 1 > \beta 2$, respectively, as thresholds for generating vibration. In other words, the threshold values $\alpha 2$ and $\beta 2$ are set so that vibration is not generated in a state in which the object is determined to be in focus but this state is close to a state in which the object is determined to be out of focus.

In step S5001 of FIG. 5C, the system control unit 50 determines whether a focus signal is within a predetermined threshold range (thresholds $\alpha 2$ and $\beta 2$) with respect to the in-focus position (within a vibration threshold range). If the focus signal is not within the vibration threshold range, the flow proceeds to step S5002, the system control unit 50 stops vibration, and the flow returns to step S5001. On the other hand, if the focus signal is within the vibration threshold range, the flow proceeds to step S5003, and the system control unit 50 generates vibration.

Next, in step S5004, the system control unit 50 determines whether the focus detecting signal (defocus value) has changed. At this time, the user can continue imaging while recognizing the focus state change by the strength of the intermittently changing vibration by making stronger the vibration as the defocus value indicating the offset amount from the in-focus position becomes larger (closer to the thresholds $\alpha 2$ and $\beta 2$ or closer to the defocus state). That is, in a case where the focus state approaches the defocus state, the flow proceeds to step S5005 and the system control unit 50 makes stronger the vibration. On the other hand, in a case where the focus state approaches to the in-focus state, the flow proceeds to step S5006 and the system control unit 50 makes weaker the vibration. On the other hand, if there is no change in the defocus value (or in the in-focus state), the state of vibration generated in step S5003 is maintained.

Next, in step S5007, the system control unit 50 determines whether or not to continue the AF operation. In a case where the AF operation is to be continued, the flow returns to step S5003. On the other hand, in a case where the AF operation is to be ended, the flow proceeds to step S5002 to stop the vibration.

Thus, in this embodiment, the system control unit 50 changes the vibration based on a change in the defocus amount in a case where the offset amount from the in-focus position in the in-focus determination is smaller than the predetermined threshold. The system control unit 50 may make larger the vibration as the focus state becomes closer to a defocus state, and makes smaller the vibration as the focus state becomes closer to the in-focus state. For example, the system control unit 50 controls the vibration so as to change the vibration amplitude and vibration frequency to a third vibration amplitude and a third vibration frequency, respectively, as the focus state becomes closer to the in-focus state (as the defocus amount becomes smaller). As the focus state becomes closer to the defocus state (as the defocus amount becomes larger), the system control unit 50 controls the vibration so as to change the vibration amplitude and vibration frequency to a fourth vibration amplitude and a fourth vibration frequency, respectively. The fourth vibration amplitude is larger than the third vibration amplitude, and the fourth vibration frequency is higher than the third vibration frequency.

A notification method may be arbitrarily changed depending on the preference of the user and imaging situation, for example, as the defocus amount becomes smaller, the vibration may be stronger or the vibration pulse may be changed. As the contrast of the object becomes lower, the in-focus determination may not be available and the vibration may be generated in order to inform that the in-focus determination is unavailable.

FIG. 5B is an explanatory diagram of changes in output signals between the in-focus state and the defocus state and a set value of an offset amount from the in-focus value in a case where the AF sensor is of the contrast detection type. A change in the contrast value depending on the focus position is measured, and a peak position that provides the highest value is determined as the in-focus state. At this time, assume that γ1 is a contrast value that decreases from the peak position and is determined to be out of focus. γ2 is a position that satisfies γ1>γ2 between the in-focus state and the defocus state, and vibration is generated between the contrast value peak and γ2. Its implementation method and effect are similar to those of the above phase-difference detecting method, as illustrated in FIG. 5C.

In a general optical apparatus for imaging, the depth of fields are different between the front side and the rear side with respect to the in-focus position, and the depth of field is different depending on the set F-number and thus the in-focus tolerance changes depending on a captured image due to the imaging setting in the image pickup apparatus. Accordingly, the set value of the offset amount (threshold) may be changed according to the change in the depth of field caused by the F-number and the focal length of the lens, or may be changed between the front side and the rear side with respect to the in-focus position. The set value of the offset amount may be previously set to the image pickup apparatus 1 or may be arbitrarily set according to the accuracy required for a captured image by the user. For example, even a portable device that includes an image pickup apparatus, such as a smartphone, can be similarly controlled, and an operation parameter that generates vibration in a case where an object face is detected may be added depending on applications.

Figure 6A:
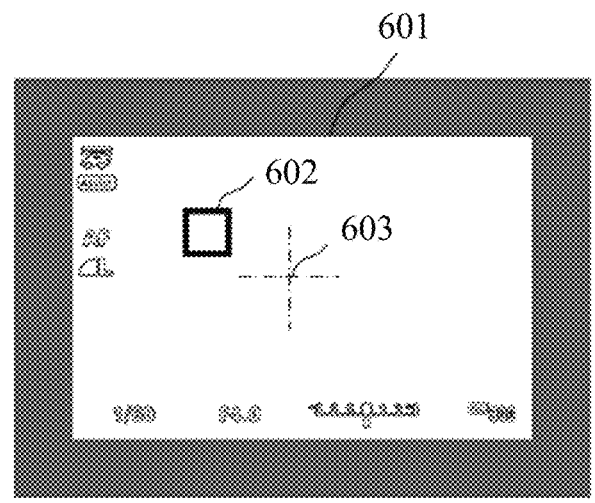
FIGS. 6A to 6D illustrate vibration control processing in a case where an object image is detected within an imaging field angle in this embodiment.
Figure 6B:
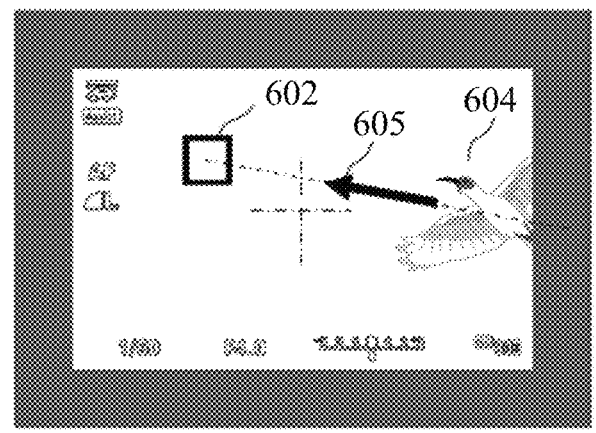
Figure 6C:
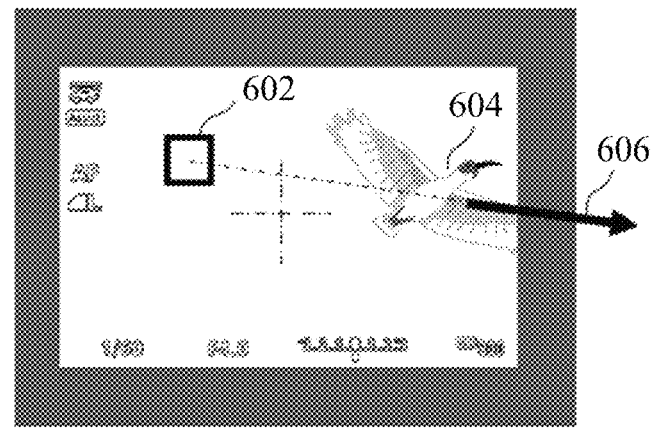
Figure 6D:
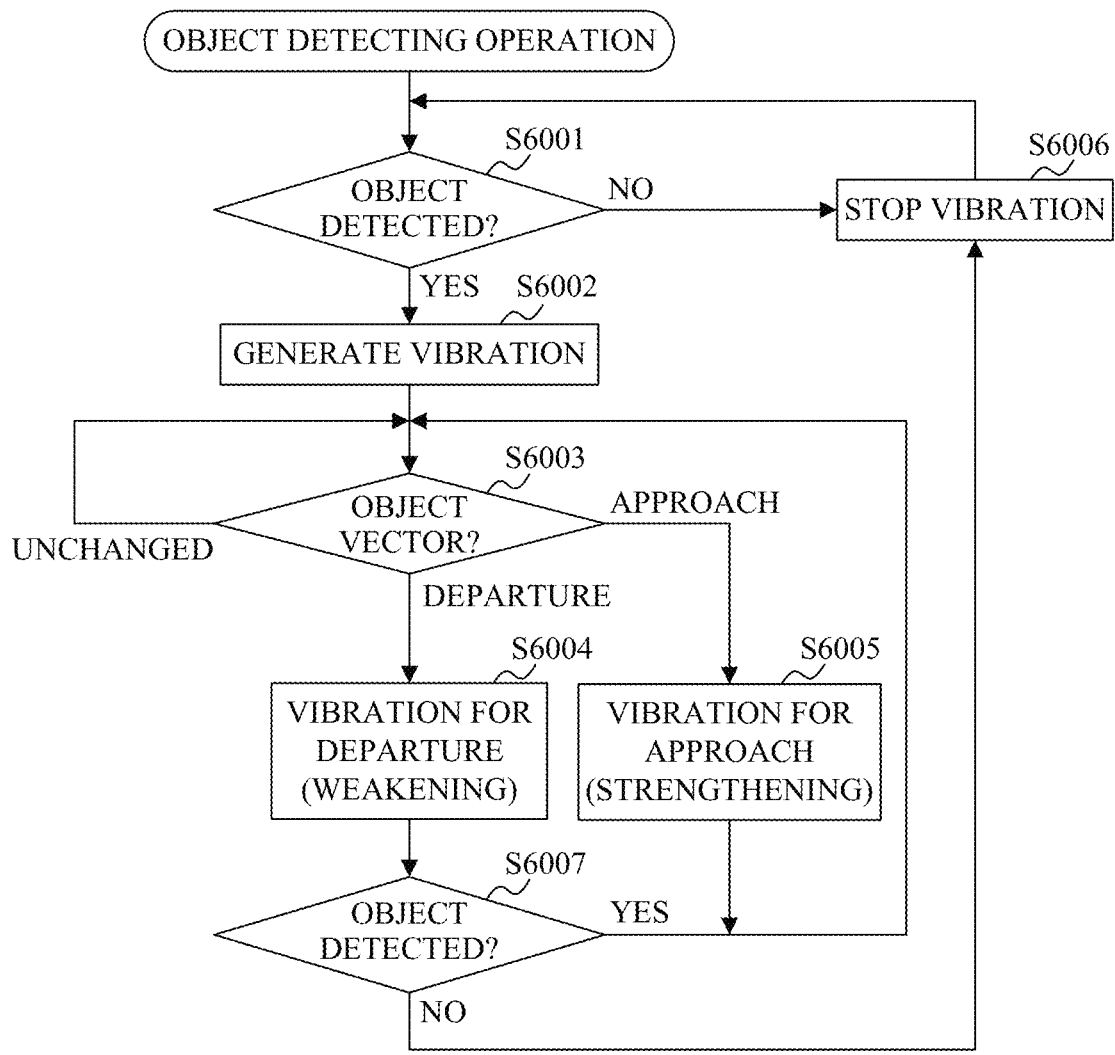

FIGS. 6A to 6C illustrate vibration control processing in a case where an object image is detected in an imaging composition, and FIG. 6D is a flowchart of the vibration control processing. The object detecting technology using the image pickup apparatus 1 can determine whether or not there is an object, such as human or animal faces and bodies, plants, vehicles, and structures, in the imaging composition, and calculate the position, size, and motion vector within the imaging composition. This embodiment generates vibration in a case where an arbitrary preset object image is detected, and enables the user to recognize the capturing state of the object through intermittent vibration in a case where it is difficult to view the LV image or look through the viewfinder during imaging while tracking a moving object.

FIG. 6A illustrates an LV image (or an inter-finder image) before an object is captured. An imaging composition (frame) 601 can be displayed on the entire display for the LV image, and can also be displayed with a black frame in a case where the inter-finder display apparatus is used. An AF frame 602 is an indicator for indicating a location where AF is to be operated, and the position and size thereof can be arbitrarily set by the user. The position and size can be automatically changed by the image pickup apparatus 1. A composition center 603 indicates the center of an imaging composition frame for explanation. The center of the imaging composition can be shown by part of grid lines, which is the function of the image pickup apparatus 1.

Referring now to FIGS. 6B to 6D, a description will be given of the vibration operation in detecting an object. FIG. 6B illustrates that an object 604 enters the imaging composition 601 from the outside of the imaging composition 601. FIG. 6D is a flowchart in detecting the object.

First, in step S6001, the system control unit 50 determines whether or not an object has been detected. In a case where no object is detected, the flow proceeds to step S6006, the system control unit 50 stops vibration, and the determination of step S6001 is repeated. On the other hand, in a case where the object is detected, the flow proceeds to step S6002 and the system control unit 50 generates vibration according to the detection. At this time, the object 604 is moving within the imaging composition 601 in a direction of an object vector 605. Here, the object vector indicates how far the object has moved since a certain timing when the object was recognized. In FIG. 6B, the object vector 605 indicates a direction connecting the object 604 and (the center of) the AF frame 602. The vector amount increases according to the speed at which the object 604 approaches the AF frame 602.

Next, in step S6003, the system control unit 50 determines the moving direction of the object using the object vector 605. Here, the system control unit 50 determines whether the object is moving toward (approaching) the AF frame 602 or away (departing or separating) from the AF frame 602 using the object vector 605.

In a case where the approach of an object is detected, the flow proceeds to step S6005, and the system control unit 50 generates vibration for approach (strengthening). This means that the vibration generated in step S6002 in the object detection is relatively strengthened according to the vector amount. At the same time, the system control unit 50 controls the vibration so as to reduce the vibration pulse as the distance between the object 604 and the AF frame 602 becomes shorter. Due to intermittent changes in vibration intensity and pulse, the user can recognize the approach of the object 604 to the AF frame 602 based on the vibration. In a case where the processing of step S6005 ends, the flow returns to step S6003. Here, in a case where the AF frame 602 is automatically set by the image pickup apparatus 1, the system control unit 50 can determine whether the object is moving toward or away from the composition center 603 as the center of the imaging range, rather than the AF frame 602. This is because in a case where the intention of the user is not reflected in the setting of the AF frame position, the configuration that places the object near the composition center is often desired. In one configuration, the user may set the position where the object is to be placed. That is, the vibration pattern may be changed as described above in a case where it is detected that the object approaches the predetermined position within the imaging range (the position of the AF frame 602, the center of the imaging range, and the position set by the user).

FIG. 6C illustrates that the object 604 is moving from the inside of the imaging composition 601 to the outside of the imaging composition 601. In a case where the object is moving as illustrated in FIG. 6C, the system control unit 50 detects the departure of the object in step S6003, and the flow proceeds to step S6004. In step S6004, the system control unit 50 generates vibration for departure (weakening). This means that the vibration generated in step S6002 in the object detection is relatively weakened according to the vector amount. At the same time, the system control unit 50 controls the vibration so as to make larger the vibration pulse as the distance between the object 604 and the AF frame 602 becomes longer. The user can recognize the departure of the object 604 from the AF frame 602 based on the vibration due to intermittent changes in vibration intensity and pulse. As described above in step S6005, instead of the AF frame 602, the departure from the composition center or the position set by the user may be detected and the vibration pattern may be changed. That is, in step S6003, the system control unit 50 may detect the approach and departure of an object to and from a predetermined range (the range of the AF frame 602, the center of the imaging range, and the range set by the user) that is part of the imaging range, and change the vibration pattern as described above between the case where the approach is detected and the case where the departure is detected.

Next, in step S6007, the system control unit 50 determines whether or not an object has been detected. In a case where no object is detected, the flow proceeds to step S6006, the system control unit 50 stops vibration, and the flow returns to step S6001. On the other hand, in a case where an object is detected, the flow returns to step S6003.

Thus, in this embodiment, the system control unit 50 changes the vibration pattern, in a state in which an object image (predetermined object image) that has previously been set to an object is detected within the imaging field angle, based on the moving direction of the predetermined object image. For example, in a case where the object is departing from the AF frame, the center of the composition (the center of the imaging range), or the range set by the user, the system control unit 50 controls the vibration so as to change the vibration amplitude and vibration frequency to a fifth vibration amplitude and a fifth vibration amplitude, respectively. In a case where the object is approaching the AF frame, the composition center, or the range set by the user, the system control unit 50 controls the vibration so as to change the vibration amplitude and vibration frequency to a sixth vibration amplitude and a sixth vibration frequency, respectively. The sixth vibration amplitude is larger than the fifth vibration amplitude, and the sixth vibration frequency is higher than the fifth vibration frequency. The system control unit 50 may change the vibration pattern based on whether or not the predetermined object image is detected within the imaging field angle.

In a case where there is no change in the object vector in step S6003, the object is stationary in the composition. In the fixed composition, the object is stationary and, for example, it means that a follow shot is successful during the follow shot. In this case, it is unnecessary to generate the vibration for approach or the vibration for departure. At this time, the vibration in step S6002 when the object 604 is first detected may be generated at an arbitrary constant period to make the user recognize that the object 604 stays stationary within the composition. For example, in a case where a selfie is to be captured with a portable device including an image pickup apparatus, such as a smartphone, in which the display for checking the LV image and the image pickup apparatus are placed on the opposite sides, the user cannot recognize the LV image. At this time, by performing control similar to that described above, the user can recognize the state of the object in the imaging composition 601 based on vibration without viewing the LV image.

The approach and departure of the object may be detected based on information other than the object vector. For example, the approach and departure of the object may be detected based on the direction and magnitude of a vector connecting the object and a predetermined position (such as the center of the imaging range) with a straight line. The departure is detected in a case where the magnitude of the vector increases, and the approach is detected in a case where the magnitude of the vector decreases.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

As described above, in this embodiment, the image pickup apparatus 1 includes a vibrating unit (vibration device 100) and a control unit (system control unit 50) configured to control the vibration (vibration pattern) of the vibrating unit. The control unit controls the vibrating unit so as to change the vibration pattern (at least one of the vibration amplitude, the vibration frequency, and the vibration time) of the vibrating unit based on the imaging state. The imaging state includes at least one of a blur state of the object, an operation of the operation unit that can input an instruction to start AF processing, an offset amount from an in-focus position in a mode that continues AF processing while the AF instruction is being input, and a detection result of a predetermined object image.

In the above embodiment, the imaging state includes, for example, a state in which object blur is detected and a state in which no object blur is detected. The vibration pattern can be changed based on the imaging state by changing the vibration pattern based on the detection result of the object blur. The imaging state includes, for example, a state in which a predetermined operation unit is operated and a state in which the predetermined operation unit is not operated. The vibration pattern can be changed based on the imaging state by changing the vibration pattern based on the detection result of whether or not the operation unit is operated. The imaging state includes, for example, a state in which an offset amount in in-focus determination is smaller than a predetermined threshold and a state in which the offset amount is larger than or equal to the threshold. The vibration pattern can be changed based on the imaging state by changing the vibration pattern based on the detection result of the offset amount. The imaging state includes, for example, a state in which a predetermined object image is detected and a state in which the predetermined object is not detected. The vibration pattern can be changed based on the imaging state by changing the vibration pattern based on the detection result of the predetermined object image.

This embodiment can provide a vibration apparatus, an image pickup apparatus, a control method of the vibration apparatus, and a storage medium, each of which can generate a variety of vibrations based on imaging states (imaging conditions) and thereby properly inform a user of an imaging state.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

For example, the above embodiment has discussed an application example to a digital camera having a follow-shot assisting function that assists the follow shot, but the disclosure is applicable to a digital camera that does not have the follow-shot assisting function. For example, even the digital camera that has no follow-shot assisting function can provide the in-focus notification using vibration described above if it has the continuous AF function. Similarly, if it has the object detecting function, the object detection result can be notified through vibration as described above. Similarly, if it has the operation unit, the operation state of the operation unit can be notified through vibration as described above.

If the imaging state is notified through vibration based on two or more types of detection results among them, the vibration pattern may be changed based on the type of detection result that causes the vibration. For example, by making different the vibration pattern in the object detection and the vibration pattern in the in-focus determination in the continuous AF, the user can determine whether the vibration is the vibration to notify that an object has been detected or the vibration to notify the in-focus state. In notifying the imaging state through vibration based on three or more types of detection results, it is unnecessary to make different vibration patterns for all of them. For example, the timing of notifying the AF operation start instruction through vibration and the timing of notifying through vibration that the offset amount from the in-focus position is small (determined to be in focus) do not almost overlap each other, and thus the user may be notified of the imaging state by the same vibration. That is, a plurality of types of detection results can include three or more types of detection results. At this time, for example, all of the vibration amplitude, vibration frequency, and vibration time of the vibrating unit are the same between a case where the vibrating unit is vibrated according to a first type of detection result and a case where the vibrating unit is vibrated based on a second type of detection result. On the other hand, the control unit may make different at least one of the vibration amplitude, the vibration frequency, and the vibration time between a case where the vibrating unit is vibrated based on the first type of detection result and a case where the vibrating unit is vibrated based on a third type of detection result.

The above embodiment has described an application example to a digital camera, but the disclosure is not limited to this embodiment. That is, this embodiment is applicable to personal computers, PDAs, mobile phone terminals, portable image viewers, etc. that have imaging control functions. This embodiment is also applicable to digital photo frames, music players, game machines, e-book readers, tablet terminals, smartphones, etc. that have imaging control functions. For example, the tablet terminal and smartphone widely use configurations that enable the user to instruct AF and AE starts (imaging preparation) by touching an object to be focused while viewing a live-view image, before capturing an image. Hence, the vibration notification may be made by connecting touching of a screen while the live-view image is displayed to the half-pressing of the shutter button in the above embodiment, and by connecting touching of the shutter button to the full pressing of the shutter button in the above embodiment. In general, the touching of the touch panel does not provide an operation sensation, and thus notifying of the operation state through vibration is effective. In some tablet terminals and smartphones, a so-called physical button (such as a volume control button) when pressed can move a mechanical part, transmit a signal, and provide an imaging instruction in addition to touching of the touch panel. In this case, the physical button provides the operation sensation, and thus the vibration may be generated by touching the touch panel and may not be generated by pressing the physical button.

The above embodiment has discussed an implementation in which the apparatus (digital camera) has the imaging control function and includes the vibrating unit, but the vibrating unit may include an apparatus separate from the apparatus having the imaging control function. For example, the remote control unit of the digital camera may include the vibrating unit, the vibration control unit, and the receiving unit, and the vibration pattern may be changed based on information about the imaging state received by the receiving unit from the digital camera body. Alternatively, the receiving unit may receive a vibration pattern instruction (vibration instruction) from the digital camera body, and the vibration control unit provided in the remote control unit may control the vibrating unit in the remote control unit according to the received vibration pattern. The separate apparatus including the vibrating unit and the vibration control unit is not limited to the remote control unit, and may not have the control function of the apparatus having the imaging control function. For example, a variety of types of notifications of the imaging states of the smartphone may be given to the user by vibrating a smart watch or a ring-shaped vibration apparatus attached to the body. In this case, the function to send instructions regarding imaging from these devices to the smartphone may not be provided.

This application claims the benefit of Japanese Patent Application No. 2022-005861, filed on Jan. 18, 2022, which is hereby incorporated by reference herein in its entirety.

What is claimed is:
1. A vibration apparatus comprising:
 a vibrating unit;
 at least one processor, and a memory coupled to the at least one processor, the memory having instructions that, when executed by the processor, perform operations as a control unit configured to control vibration of the vibrating unit,
 wherein the control unit changes a vibration pattern of the vibrating unit by controlling the vibrating unit so as to change at least one of a vibration amplitude, a vibration frequency, and a vibration time according to at least one of a detection result of an offset amount from an in-focus position and a detection result of a predetermined object image in a mode that continuously performs autofocus processing.
2. The vibration apparatus according to claim 1, wherein the control unit changes the vibration pattern according to the detection result of the offset amount from the in-focus position.

3. The vibration apparatus according to claim 2, wherein the offset amount from the in-focus position is an offset amount between a predicted value of the in-focus position in the mode that continuously performs the autofocus processing and an actual in-focus position.

4. The vibration apparatus according to claim 2, wherein the control unit controls the vibration pattern such that the vibration amplitude in a case where the offset amount is smaller than a predetermined amount is smaller than that in a case where the offset amount is equal to or larger than the predetermined amount.

5. The vibration apparatus according to claim 2, wherein the control unit controls the vibration pattern such that the vibration frequency in a case where the offset amount is smaller than a predetermined amount is lower than that in a case where the offset amount is equal to or larger than the predetermined amount.

6. The vibration apparatus according to claim 2, wherein in a case where the offset amount decreases, the control unit controls the vibration so as to change the vibration amplitude and the vibration frequency to a third vibration amplitude and a third vibration frequency, respectively, and
wherein in a case where the offset amount increases, the control unit controls the vibration so as to change the vibration amplitude and the vibration frequency to a fourth vibration amplitude larger than the third vibration amplitude and a fourth vibration frequency higher than the third vibration frequency, respectively.

7. The vibration apparatus according to claim 1, wherein the control unit changes the vibration pattern according to a moving direction of the predetermined object image.

8. The vibration apparatus according to claim 7, wherein the control unit changes the vibration pattern according to whether the predetermined object image is moving away from a predetermined position or the predetermined object is moving toward the predetermined position.

9. The vibration apparatus according to claim 8, wherein the predetermined position is at least one of an autofocus area, a center of an imaging range, and a position set by a user.

10. The vibration apparatus according to claim 8, wherein in a case where the predetermined object image is moving away from the predetermined position, the control unit controls the vibration so as to make the vibration amplitude smaller than that in a case where the predetermined object image is moving toward the predetermined position.

11. The vibration apparatus according to claim 8, wherein in a case where the predetermined object image is moving away from the predetermined position, the control unit controls the vibration so as to make the vibration frequency higher than that in a case where the predetermined object image is moving toward the predetermined position.

12. The vibration apparatus according to claim 8, wherein in a case where the predetermined object image is moving away from a predetermined position in an imaging range, the control unit controls the vibration so as to change the vibration amplitude and the vibration frequency to a fifth vibration amplitude and a fifth vibration frequency, respectively, and
wherein in a case where the predetermined object image is moving toward the predetermined position in the imaging range, the control unit controls the vibration so as to change the vibration amplitude and the vibration frequency to a sixth vibration amplitude larger than the fifth vibration amplitude and a sixth vibration frequency higher than the fifth vibration frequency, respectively.

13. The vibration apparatus according to claim 1, wherein the control unit vibrates the vibrating unit according to a plurality of types of detection results including at least two of a detection result of a blur state of an object, a detection result of an operation of an operation unit configured to input an instruction to start the autofocus processing, the detection result of the offset amount from the in-focus position in the mode that continuously performs the autofocus processing in an input of an autofocus instruction, and the detection result of the predetermined object image, and
wherein the control apparatus changes the vibration pattern by changing at least one of the vibration amplitude, the vibration frequency, and the vibration time of the vibrating unit according to one of the plurality of types of detection results.

14. The vibration apparatus according to claim 13, wherein the plurality of types of detection results include three or more types of detection results, and
wherein the control unit uses the same vibration pattern of the vibrating unit between a case where the vibrating unit is vibrated according to a first type detection result and a case where the vibrating unit is vibrated according to a second type detection result, and the control unit uses different vibration patterns between a case where the vibrating unit is vibrated based on the first type detection result and a case where the vibrating unit is vibrated based on a third type detection result.

15. The vibration apparatus according to claim 1, further comprising a receiving unit configured to receive from the vibration apparatus a detection result of a blur state of an object, a detection result of an operation of an operation unit configured to input an instruction to start the autofocus processing, the detection result of the offset amount from the in-focus position in the mode that continuously performs the autofocus processing in an input of an autofocus instruction, and the detection result of the predetermined object image,
wherein the control unit vibrates the vibrating unit based on a detection result received by the receiving unit.

16. The vibration apparatus according to claim 1, further comprising a receiving unit configured to receive a vibration instruction from the vibration apparatus,
wherein the control unit vibrates the vibrating unit based on the vibration instruction.

17. An image pickup apparatus comprising:
the vibration apparatus according to claim 1; and
an imaging unit that includes an image sensor and an imaging control unit configured to control imaging using the image sensor,
wherein the control unit acquires information about the detection result from the imaging unit.

18. The image pickup apparatus according to claim 17, wherein the image pickup apparatus configured to provide silent imaging.

19. A control method of a vibrating apparatus, the control method comprising the steps of:
setting at least one of a vibration amplitude, a vibration frequency, and a vibration time of a vibrating unit so as to change the at least one according to at least one of a detection result of an offset amount from an in-focus position and a detection result of a predetermined object image in a mode that continuously performs autofocus processing; and
vibrating the vibrating unit according to the set at least one.

20. A non-transitory computer-readable storage medium storing a program for causing a computer to execute the control method according to claim 19.

\* \* \* \* \*